March 24, 1970 T. STILLMAN 3,502,072
WATER JET TOOTH CLEANSING AND THERAPEUTIC IMPLEMENT
Filed Sept. 23, 1966 4 Sheets-Sheet 1

THEODORE STILLMAN,
INVENTOR.

BY
Lynn H. Latta
—ATTORNEY—

United States Patent Office 3,502,072
Patented Mar. 24, 1970

3,502,072
WATER JET TOOTH CLEANSING AND
THERAPEUTIC IMPLEMENT
Theodore Stillman, 17329 San Jose St.,
Granada Hills, Calif. 91344
Filed Sept. 23, 1966, Ser. No. 584,321
Int. Cl. A61h 9/00; A61m 3/00
U.S. Cl. 128—66
31 Claims

ABSTRACT OF THE DISCLOSURE

A therapeutic oral hygiene implement including a toothbrush unit at one end; a pick and massage device at the other end, means for delivering tubular jets of pure water or dentifricially beneficial solutions of water surrounding the bristle tufts of the brush, and surrounding the pick; means for coupling the implement to a faucet to deliver water to the implement; and means for selectively directing the water to the brush or to the pick, as desired. The bristle tufts and the pick are anchored in a mounting bar. The jacket and bar cooperatively function as a handle. The tufts and pick project through concentric apertures in a water jacket extending lengthwise of the mounting bar on one side thereof so as to provide water distribution ducts extending to the brush and the pick. The apertures are of larger diameter than the bristle tufts and pick which extend through them, whereby annular water delivery ports are defined about the tufts and the pick. Thus the water jets surround and travel along the surfaces of the tufts and pick so as to flush the areas being scrubbed by the bristle tufts or scraped by the pick. This invention also describes an elongated flexible casing that can be fitted over the average toothbrush or toothpick and thereby convert them to a water delivery toothbrush and toothpick.

The prior art

A tooth cleanser having a single water delivery port in the center of a brush or other scrubbing device, is shown in Schamber Patent No. 1,278,225 and in Drapen Patent No. 3,225,759. A toothbrush with a plurality of water delivery ports located between the tufts, is shown in Braunstein Patent No. 2,028,042. A toothbrush with tubular flexible bristles (e.g. of soft rubber) each delivering a water jet through its hollow center, is shown in Eggers Patent No. 1,327,757. A device comprising a single nozzle for delivering a jet of water for teeth cleaning, is marketed under the name "Water Pick."

Description of invention

A principal object of the invention is to provide a water jet tooth cleansing implement of improved performance as compared to such prior devices, in that a tubular water jet of adequate volume is delivered around each bristle tuft or pick and travels along the surface thereof so as to provide a ring of flushing contact immediately surrounding the area of scrubbing contact of each bristle tuft and pick, for maximum efficiency of cleansing action.

Another object is to provide an implement especially efficient in providing hydraulic massage therapy.

Additional objectives are:

(1) To provide means for delivering therapeutic dentifrices dissolved in a pressurized stream of hot water;

(2) To provide for the use of massaging disposable pads that do or do not have therapeutic dentifrices dissolved in them;

(3) To provide for the use of radial massaging veins that can massage the gums and cleanse the area of the teeth near the gum line;

(4) To utilize massaging hydro therapeutic apertures;

(5) To provide a single implement that contains a pick and massaging orifices at one end and a brush at the other end, means for delivering pressurized water to both, and means for controlling the direction of stream of water and the size and pressure of stream of water;

(6) To provide a simple device for converting an ordinary toothbrush and an ordinary toothpick into a water delivery toothbrush and a water delivery toothpick;

(7) To provide to efficient water faucet adaptor;

(8) To provide the means for switching from hot to cold water and/or pure water to water that contains therapeutic dentifrices dissolved in it;

(9) To provide a simple and inexpensive method of manufacture;

(10) To provide a means for delivering pressurized streams of water of adequate volume or large volume flushing streams of water;

(11) To provide the ideal pick to be used in connection with this invention;

(12) To provide a variety of picks and brushes to fit a variety of needs;

(13) To provide the means for interchanging one implement with another or to provide the means for interchanging the implements that are hooked into a water source;

(14) To provide an ideal water delivery toothbrush system and massaging pick water delivery system;

(15) The primary, but not the only object, of this invention is to find the means that will make it possible to place dental implements within a stream of water of adequate volume, said water, therefore, flows down and around the surface of the dental implement until both the water and the dental implement are touching the same surface at the same time.

Other objects will become apparent in the ensuing specifications and appended drawings, wherein:

FIGS. 26A, B, C, and D are a group of schematic views illustrating several alternative forms of the invention;

FIG. 26B shows a removable pick nozzle head in place on jacket;

FIG. 32A is a top view of a modified form of this invention;

FIG. 32B is an axial section of FIG. 32A;

FIG. 32C is a section along the line C—C of FIG. 32A;

Figure 1:
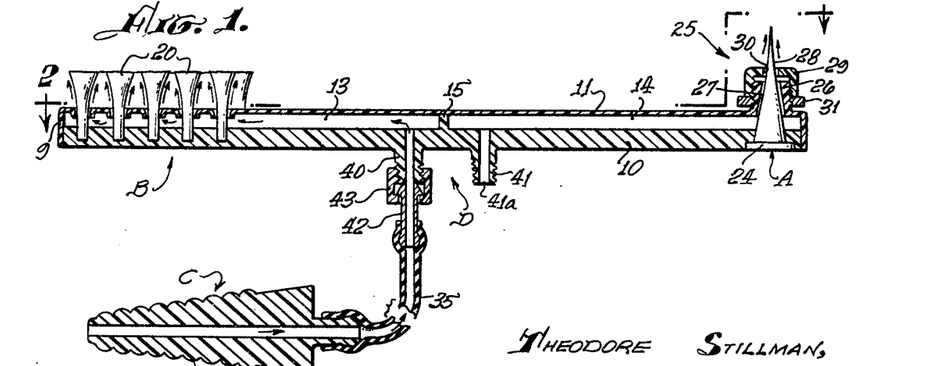
FIG. 1 is a longitudinal sectional view of a cleansing and therapeutic implement embodying the invention.
Figures 2, 5, 6:
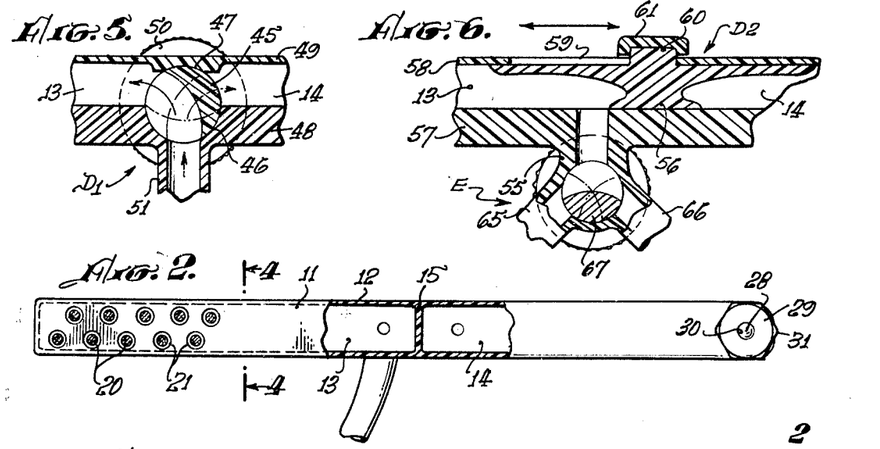
FIG. 2 is a plan view of the same with a central portion broken away and shown in section.
FIG. 5 is a sectional view of a modification of the implement.
FIG. 6 is a detail sectional view of another modification.
Figure 3:
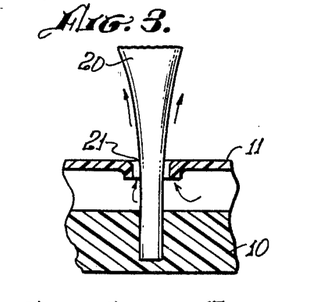
FIG. 3 is a fragmentary detail sectional view of a single bristle unit.
Figure 4:
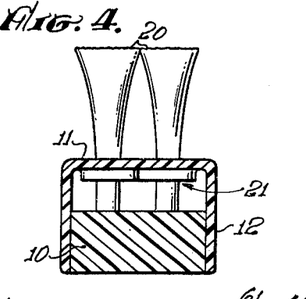
FIG. 4 is a cross-sectional view taken on line 4—4 of FIG. 2.

Referring now to the drawing in detail, I have shown in FIGS. 1–3 thereof, as an example of one form in which the invention may be embodied, a dental implement including a pick portion A, a brush portion B, a water supply hose and coupling assembly C, and a means D for selectively connecting assembly C to either brush portion B or pick portion A.

The implement embodies a mounting bar 10 which is relatively thick, and a relatively thin water jacket 11 of narrow, elongated trough shape having integral side and end walls 12 and 9 embracing, secured and sealed to side and end faces of bar 10, the jacket 11 being spaced from the opposed face of bar 10 so as to define a pair of aligned water delivery ducts 13 and 14 which are separated by a partition 15 traversing the space between bar 10 and jacket 11. Partition 15 may be formed integrally with jacket 11 and bounded to bar 10, or vice versa. Bar 10 and jacket 11 can be of molded synthetic resin plastic material or other suitable material.

Brush B comprises a plurality of bristle tufts 20 having respective stems anchored in mounting bar 10 (e.g. molded in) and traversing the duct 13, and having respective brushing tips projecting from jacket 11. The tuft stems extend through apertures in jacket 11, thus defining annular water jet ports 21 encircling the stems concentrically.

Pick unit A comprises a pick 25 of conical form, with a base 24 anchored in the bar 10. The pick traverses the water duct 14 and projects through a coaxial integral collar 26 on jacket 11, with spacing such as to define an annular throat 27 for passage of a water jet, and has a projecting tapered spike 28 which extends through a central aperture in the end of a cap 29 that is threaded into collar 26, thnus providing an annular nozzle 30 the area of which can be diminished or enlarged by rotatably adjusting the cap 29 on the collar 26. A lock nut 31 may be utilized to lock the cap 29 in any selected position of adjustment.

The pick 25 is of soft, flexible material such as soft rubber, stiff enough to be used as a pick for dislodging food particles from between the teeth, but flexible and soft enough for massage operation.

Hose and coupling assembly C comprises a flexible hose 35 (e.g. rubber) attached at one end to a tubular conical coupling plug 36 of compressible resilient material such as soft rubber, and attached at its other end to connecting means D so as to supply to the implement, water delivered from a faucet into which plug 36 is wedged.

Connecting means D comprises a pair of integral nipples 40 and 41 on mounting bar 10, positioned on opposite sides of partition 15 and communicating with ducts 13 and 14 respectively, a coupling stem 42 attached to hose 35, and a gland nut 43 on stem 42, adapted to be selectively threaded onto either nipple 40 or nipple 41, so as to connect the hose 35 to the duct 13 or to the duct 14, as desired.

The bar 10 and jacket 11 cooperatively constitute a handle which is grasped by the user to manipulate the device. The space between nipples 40 and 41 in FIG. 1 is wide enough so that a finger can be extended through the space and curled around the bar 10.

FIG. 5 illustrates a modified form of the connecting means, designated D1, comprising a three-position rotatable valve. The valve comprises a cylindrical valve plug 45, rotatably mounted between seats 46 and 47 of segmental-cylindrical form, integral with the bar 48 and jacket 49, which are the same as bar 10 and jacket 11 except that the valve plug 45 replaced the partition 15. One end of valve plug 49 extends through a side of the bar and jacket assembly and is provided with a knob 50 of disc form, with knurled periphery, for rotating the valve. The valve has a position, shown in full lines, in which it directs flow to duct 13; a second position, shown in dotted lines, in which it directs flow to duct 14; and a third position, shown in dot-dash lines, in which it closes off the throat of a single nipple 51 which connects the implement to hose 35.

Operation

The water (hot or cold or warm) delivered to duct 13 or duct 14 (depending upon the adjustment of connector means D or D1 or D2) will be delivered through the annular ports 21 around bristles 20, or through the annular port 30 around the spike 28 or pick 25, to provide a sleeve-like jet of water which, by surface adherence, will flow along the surfaces of the bristle tufts or pick as the case may be, and will impinge upon the areas of teeth or gums which are being brushed, picked or massaged. Where food particles or other foreign matter is being dislodged by brushing or picking action, these particles will immediately be engaged by the annular water jets surrounding the individual areas of brushing or picking action, and the dislodged particles will be flushed away with maximum efficiency.

The water discharge port 30 around pick 25 may be adjusted to the area best suited for (1) flushing away food particles dislodged in a picking operation for cleaning between the teeth, or (2) a therapeutic gum-massage operation in which a jet of warm or hot water is directed against an area of the gums, with a beneficial therapeutic effect, while the pick 25 is used for massaging the same area.

I find that there is a very beneficial therapeutic effect derived from injecting hot water against the gums while brushing them with brush unit B or massaging them with pick unit A. Beneficial results can also be obtained by using the water jets for hydraulic massage without operating the brush tufts or pick in contact with the teeth or gums.

Figures 7, 8, 11A, 11B, 32:
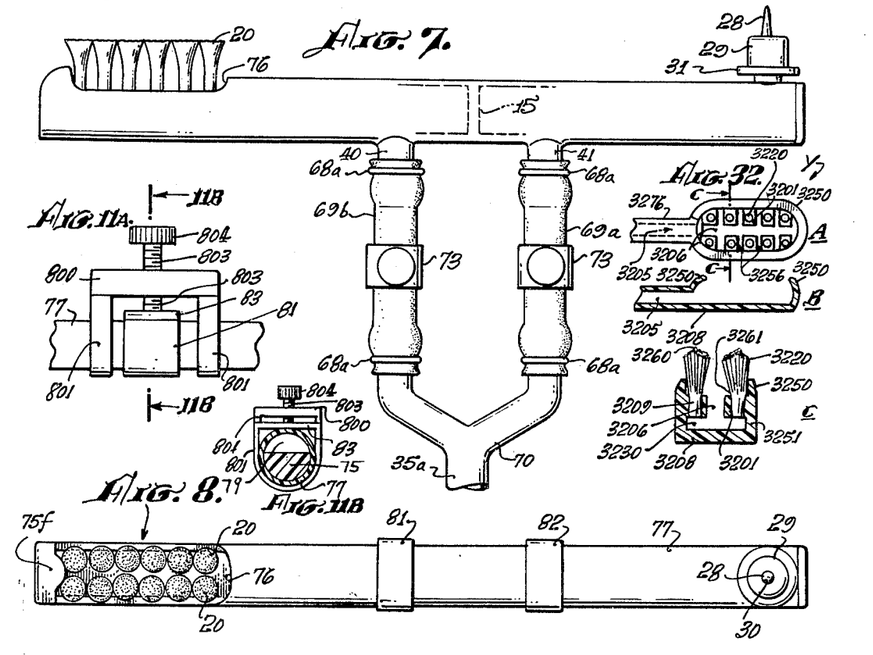
FIG. 7 is a side elevational view of a further modified form of the invention.
FIG. 8 is a plan view of another modification.
FIG. 11A is a plain side view of a strap hose clamp, showing a second pressure bar strapped in place over finger pressure bar.
FIG. 11B is a sectional view of strap hose clamp on line 11B—11B of FIG. 11A.
Figure 9:
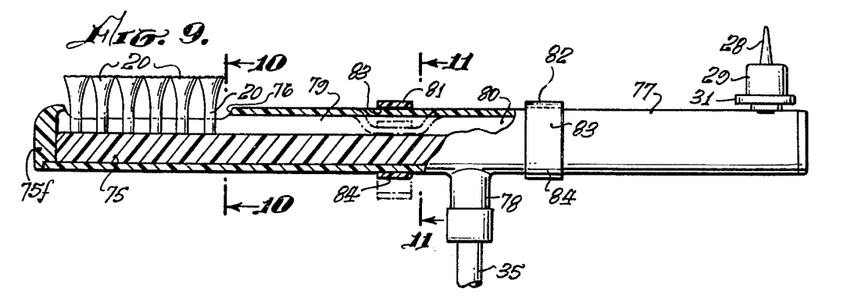
FIG. 9 is a side elevational view of the same with parts broken away and shown in section.
Figure 10:
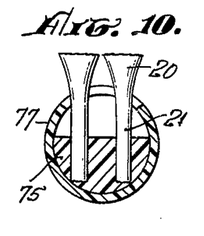
FIG. 10 is a cross-sectional view of the same on the line 10—10 of FIG. 9.
Figure 11:
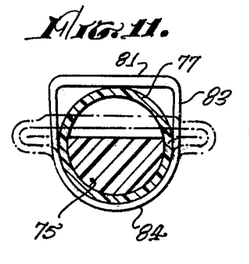
FIG. 11 is a cross-sectional view of the same on the line 11—11 of FIG. 9, showing the effect of compressing the elastic tubing.

Referring now to FIG. 7, water may be supplied from a single hose such as hose 35 of FIG. 1 to a Y-branching fitting 70 having connections to respective flexible tube sections 69A, 69B connected to respective nipples 40, 41 of the construction shown in FIG. 1, the hose sections 69A, 69B cooperating with hose clamps 73 to selectively direct the water into the brush section or the pick section of the implement. These parts may be as disclosed in FIG. 1, or the brush structure as indicated, may be as shown in FIGS. 8–11, now to be described.

FIGS. 8–11 disclose another modification of the invention wherein the brush section (as shown also in FIG. 7) comprises a plurality of bristle tufts 20, mounted in a semi-cylindrical bar 75 and projecting through a single elongated aperture 76 in a cylindrical jacket 77 which can be of a tough, flexible inert plastic material such as that known commercially as Tygon. Water supply tube 35 is connected to a single inlet nipple 78 communicating with both water ducts 79 and 80 defined between jacket 77 and mounting bar 75 on opposite sides of inlet 78, and can be selectively cut off from communication with either the brush section or the pick section by operating one of a pair of finger-pressure bars 81, 82, to close off one of the ducts 79, 80, thereby directly the water flow to the other duct. Bars 81, 82 are each held in operative relation to the jacket 77 by means of a pair of flexible straps 83 which may be integrally attached to the ends of the respective pressure bar and attached to the jacket 77 at respective sides thereof (e.g. by means of an integral loop 84 extending around and bonded to the half of the jacket filled by mounting bar 75). Upon pressing a bar 81 or 82 against the underlying portion of the jacket, the latter will be flattened against the flat inner face of mounting bar 75 (the bar 81 being positioned parallel to said inner face) so as to close off the respective chamber, the arms 83 bowing outwardly in response to outward bulging of the respective sides of the flattened portion of the jacket, as indicated by broken lines in FIG. 11.

FIG. 6 illustrates a modified form of selection means designated D2 comprising a slide valve 60, that can be slid back and forth in slot 59 and between the two surfaces 58 and 57, thereby directing the water down duct 13 or duct 14. Rotatable valve E is the same as valve D1, it directs water entrance from shaft 65 or 66, depending on the position of circular valve 67.

Figure 12:
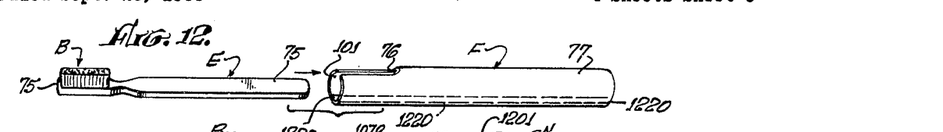
FIG. 12 is an exploded view of a toothbrush and its casing.
Figure 12A:
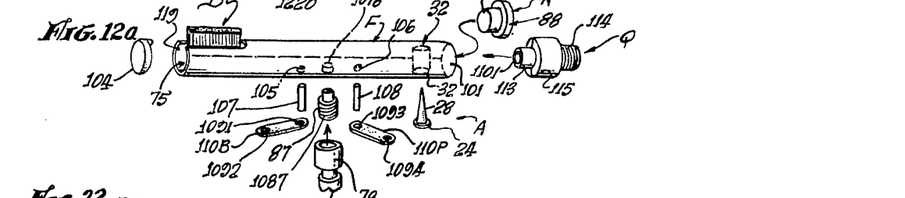
FIG. 12A is an exploded view of a toothbrush and tooth pick with casing.
Figures 13, 14, 15, 16, 16A, 17, 17A, 18, 18A, 18B, 19, 20, 21:
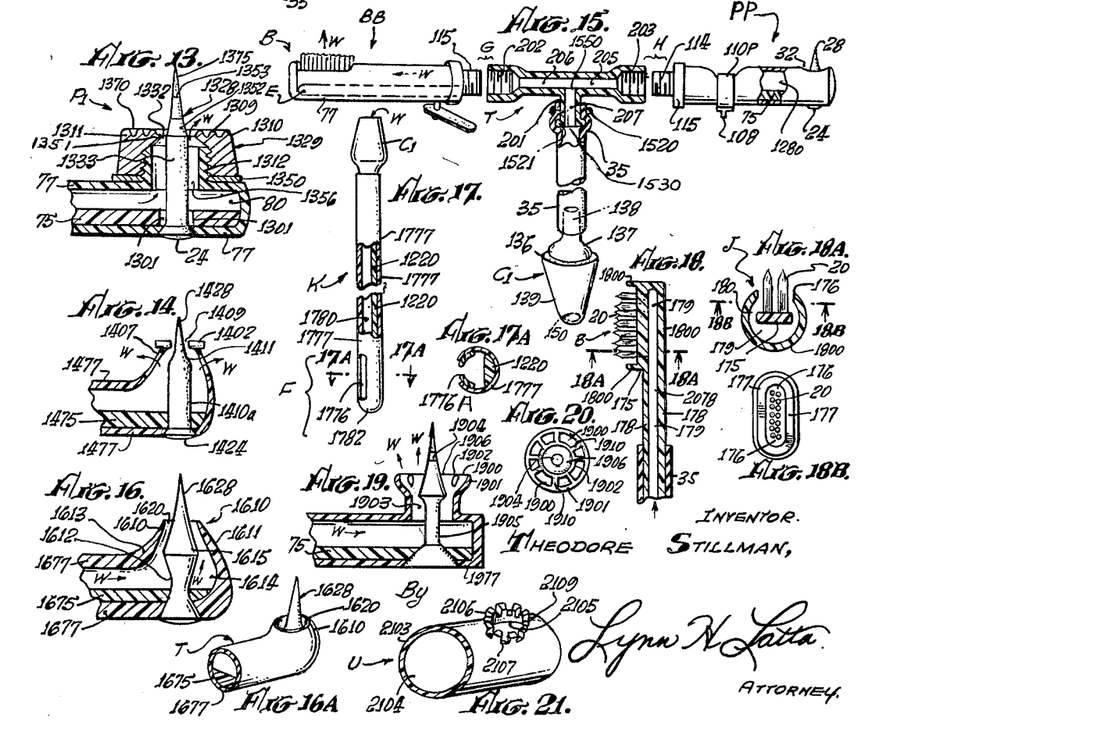
FIG. 13 is a detail sectional view of the pick associated with a massaging cap.
FIG. 14 is a detail sectional view of a modified form of pick and massage head.
FIG. 15 is an exploded view of a hygiene implement embodying another modified form of the invention, with parts broken away and shown in section.
FIG. 16 is a detail sectional view of a modified form of the pick associated with an expendible orifice.
FIG. 16A is a top perspective view of the same.
FIG. 17 is a side view, partially in section, of a modified form of the jacket of the device.
FIG. 17A is a cross-sectional view of the same on line 17A—17A of FIG. 17.
FIG. 18 is an axial sectional view of a modified form of the brush assembly, having a longitudinal slit-type orifice.
FIG. 18A is a cross-sectional view of the same on the line 18A—18A of FIG. 18.
FIG. 18B is a sectional view of the same on line 18B—18B of FIG. 18A.
FIG. 19 is an axial sectional view of another modified form of pick and massage head.
FIG. 20 is a top view of the massage head.
FIG. 21 is a perspective view of a pick nozzle head attachable to the jacket of FIG. 17.

FIG. 12 shows one possible method that can be used to manufacture one of the forms of this invention namely a water delivery toothpick and toothbrush combined on a single mounting bar 75 (FIG. 12) also shows one way to construct a water delivery toothpick PP¹, or a water delivery toothbrush BB¹; shaft 115 of toothbrush BB and shaft 114 of toothpick PP can be threaded into T adaptor (FIG. 15). Said T adaptor (FIG. 15) has threaded apertures 202 and 203 into which said toothbrush BB and toothpick PP can be threaded. The T adaptor also has a single water inlet nipple 201; said nipple 201 is connected to water faucet via hose 35 and adaptor C1 or C. Apertures 1530–202 and 2003 are connected to corresponding ducts 207, 206, 205; said ducts intersect and are joined at their point of intersection 1550.

The steps in the construction of a dual water delivery instrument that has a pick P and brush B on a single mounting bar 75 is as follows: A toothbrush consisting of brush B and handle 75 is placed within flexible casing F. End cap 104 is cemented into end hole 119; end cap N is cemented into end hole 101.

Holes 105, 1078 and 106 are drilled and their corresponding parts 107, 87 and 108 are cemented within holes.

Hole 1078 is drilled entirely through mounting bar 75 and the bottom wall of jacket 77, in order that the shaft 1087 of the hollow niblet 87 will be connected with ducts 79 and 80, and in order that water can flow through nipple duct 1087 and through mounting bar 75 and into ducts 79 and 80 and finally out apertures 76 or 32, depending on which duct 79 or 80 is closed off. Hole 32 is drilled entirely through both opposing walls of jacket and mounting bar 77 contained within jacket F. The pick 28 is cemented into hole 32, so as to seal the base of pick 24 within the mounting bar and so the pick 28 projects through aperture 32 above the outer wall of the jacket 77.

Band 110B is fastened onto peg 107 by putting peg 107 into hole 1091 of band 110B and cementing it into place.

Band 110P is fastened onto peg 108 by putting peg 108 within hole 1093 of band 110P and cementing it in place.

Replaceable water delivery toothbrush BB (FIG. 12) consists of hollow flexible casing F, into which is placed toothbrush and handle 75, so that brush bristles 20 protrude above flexible jacket 77. End cap 104 seals end opening 119 and shaft 113 of adaptor Q is placed within aperture 101.

Adaptor Q is hollow and has shaft 1101 running through its center along the longitudinal axis. Thus when adaptor Q is attached to F and threaded male shaft 114 is threaded into T adaptor via threaded inlets 202 on adaptor T, water can enter from duct 207 and continue down duct 206 and through duct 1101 and down duct 1279 and finally out aperture 76. Threaded replaceable water delivery pick PP has the same construction as BB except that the pick-spike 28 protrudes above and beyond aperture 32; aperture 32 is a simple concentric hole in jacket 77; band 110P can be stretched around jacket 77 and fastened onto peg 108 through aperture 1094, thereby closing off duct 1280 and stopping the passage of water to and out of aperture 32, releasing band 110P will permit the flow of water from duct 207 down duct 205, 203, 1101, 1280 and finally out aperture 32.

FIG. 15 brackets G indicates that BB is about to be threaded into adaptor T by threading male threaded shaft 115 into female threaded inlet 202.

Bracket H indicates that pick PP is about to be threaded into adaptor T via female threaded inlet 203 and male threaded shaft 114.

T adaptor nipple 201 is joined to the flexible hose 35 by stretching hose 35 over nipple ridge 1521 and placing circular spring clamp 1520 over hose 35.

FIG. 13 describes one possible pick 1328 and one possible cap 1329 that can be used. Cap 1329 is threaded over threaded sleeve 1312. Pick fits through and projects above annular aperture 1332. Note the circular ridges 1309, 1310 and 1311 on top of cap.

Radial ridges 1910 traverse the circular ridges as in FIG. 20. The cap can be placed close enough to the tip of pick to permit massaging the gums with circular ridges 1310, 1309 and 1311 and radial ridges such as 1910 in FIG. 20.

The cap is threaded up or down and then locked in place with lock and nut 1950. Thus, as one massages one's gums between the teeth with pick, one can also receive massage therapy of the entire surface of the gums and teeth with ridges on cap.

The ridges and upper surface can be made of sponge-like material that has been presoaked with soap and gritty material. The cap can therefore be a disposable source of dentifrice. Said dentifrice becomes effective as the water flushes out of orifice 1332.

FIG. 13 also illustrates some of the factors that need to be considered in designing water delivery pick. Water duct 1356 is not restricted at any point and is of sufficient size to deliver sufficient water to orifice 1332, said orifice is defined between the edges 1351 of the cap orifice and the outside surface of pick 1333. The edge 1351 of cap orifice is in the position shown in FIGURE 13, when the cap 1329 is completely threaded down on sleeve 1312. Note that when the cap is in the position shown, the edge 1351 of cap is opposite the inflection point 1352 on pick. When the cap is screwed up, thus moving the top of cap 1370 closer to the tip 1375; slight changes in the distance between the top of cap 1370 and the tip of pick 1375 will have significant effect on the size of orifice 1332, because the edge 1351 of cap orifice comes to a circular line and because the inflection point 1352 brings about an abrupt change in diameter from the diameter from the diameter of the neck of pick 1333 to the diameter of the shaft of spike 1353; such an abrupt change in diameter makes possible adequate control over the flow of water from the aperture. The cap 1329 of necessity must be shallow in depth. Thus, one or two revolutions of the cap 1329 on threaded sleeve 1312 requires a means of providing adequate controls over size of aperture. The above abrupt change in diameter 1352 on pick provides the needed aperture controls provided rim 1351 of cap orifice is placed opposite the inflection point 1352 and provided that said rim 1351 of cap orifice is represented by line, rather than a sleeve like surface.

FIG. 19 describes a cap which is at a fixed distance from the tip of pick. Said cap has apertures 1900 and 1906 between the circular ridges. The radial vanes or blades 1910 and circular vanes 1901, 1902 therefore define what may eventually be called massaging hydro-heat, therapeutic apertures. It is the rims of such apertures that do the actual massaging and cleansing. Said massaging hydro-therapeutic heat apertures can be used for several purposes, namely:

(1) They are the outer limits of the aperture.

(2) The rims of said apertures can be used to massage gums and clean teeth.

(3) The rims of said apertures are surrounded by a stream of water and lie within the same flat or curved plane. The entire surface of the plane is used for apertures and ridges. Prior inventions made use of only a small percent of the useful area of the end walls.

(4) Since said rims are surrounded by a stream of water as they massage the gums and medicinal dentifrices can be incorporated into the sponge-like material from which they are made. Said vanes formed by the rims will be surrounded by a stream of water. Therefore the vanes, blades or ridges deliver a stream of medicinal containing water.

(5) Soapy dentifirices can be absorbed into said rims of apertures. Thus, rims can be used to scrub with dentifrice.

Figures 22, 23, 23A, 24, 31:
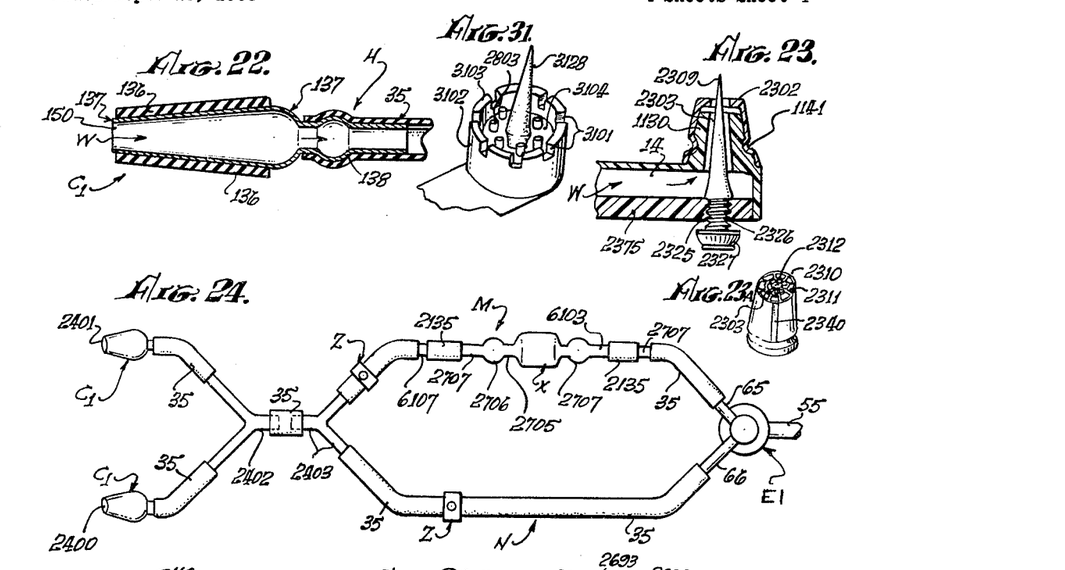
FIG. 22 is an axial sectional view of a faucet adaptor.
FIG. 23 is a detail sectional view of another modified form of the pick orifice assembly, said assembly shows a replaceable cap in place on sleeve around the pick.
FIG. 23A shows a top side plan view of a replaceable cap that can be fitted on sleeve defining orifice FIG. 23.
FIG. 24 is a plan view of a modified form of the water system of the apparatus.
FIG. 31 is a top perspective view of the assembly of FIG. 28 with pad removed.
Figures 25, 26, 27, 28, 29, 30, 35, 36, 37:
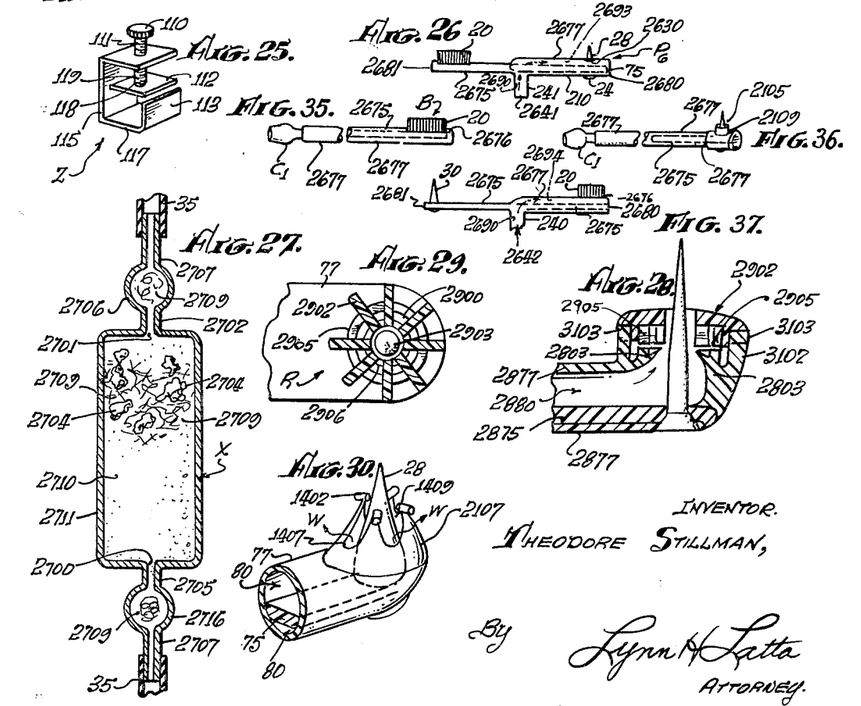
FIG. 25 is a perspective view of a hose clamp that can be used in the apparatus.
FIG. 27 is an axial sectional view of a medicinal pack usable as a unit of the invention.
FIG. 28 is a detail sectional view of another modified form of pick and orifice assembly, it shows disposable pad in place.
FIG. 29 is a sectional view through the top of disposable pad in place on jacket.
FIG. 30 is a top perspective view of modified form of pick orifice and massage assembly as shown in FIG. 14.
FIGS. 34–36 show perspective views of a brush or pick and casing with modified end fittings.
Figures 33, 34:
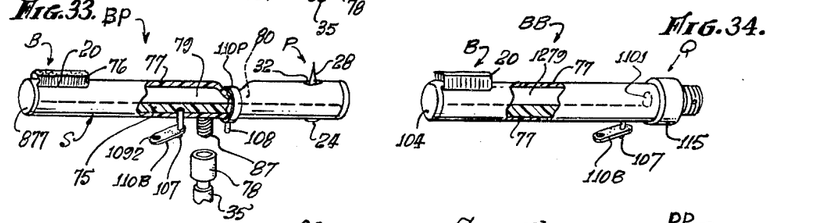
FIG. 33 shows an encased toothbrush and pick with the pick blocked from the flow of fluid.

FIG. 29 describes one type of disposable pad with massaging hydro-therapeutic apertures. Note that the spaces between said vanes of said massaging hydro-therapeutic pad contains radial vanes 2902 that fit into corresponding slots 3101 on sleeve depicted in FIG. 31; said radial vanes 2902 only fit part way into slots; therefore, the vanes or blades of pad (R) FIG. 29 project above the top of sleeve 3102 (FIG. 31). FIG. 28 depicts a radial vane 2902 snapped into place, in slot 3101 lying between ridges 3103 and depicts radial vanes 2902 lying above the upper surface of rim 3103. Note also that FIG. 28 shows that the radial blades or vanes 2902 have a footlike projection 2905 that rests on sleeve supports 2803, said footlike projection is joined together to form ring 2905, supports 2803 for radial vanes or blades 2902 can also be seen in diagram 31.

FIG. 30 depicts another type of massaging, aperture, water flows out aperture 1407 and 1409 and around massaging radii 1402.

Note that pick rests between teeth as radial blades or vanes 2902, FIG. 28 and 1910, FIG. 19 and FIG. 20 and 1402, FIG. 30 are swept across teeth and guns and as pressurized streams of water cleans the area being massaged and cleaned.

The most likely areas for dental caries are between the teeth or along the gum line. Dental caries occur near the gun line because tartar collects and irritates the gums, which causes the gums to recede. When the gums recede, the soft part of the enamel is exposed and thereby makes dental caries and infected gums more likely. Thus an implement is needed that will be especially effective in cleaning the tartar off the teeth. The radial ridges, blades or vanes 2902, FIGS. 28 and 29 and radial vanes 1910, FIG. 20 and the radial vanes 2902, FIGS. 28, 29, represent the much needed implement for cleaning tartar off teeth near the gum line, especially if dentifrices are incorporated within or placed upon the vanes.

Another critical area is the area between the teeth. The picks illustrated in FIGS. 13, 14, 16, 31, 23 and 28 are especially effective because they have sharp points or have narrow angles described between the sides that intersect. Said sharp point makes it more possible for pick to be placed between the teeth and therefore facilitates the passage of a stream of water down the pick and through the crevices between the teeth. Such an implement is ideal for cleaning the areas between the teeth. Since bacteria thrive on food between the teeth, said implement may be ideal for preventing caries between the teeth. Since a stream of hot water has been shown to be remarkably effective in cleaning up infections, a stream of hot water flowing down a pick between teeth becomes a remarkably effective means of cleaning up infections of the gums and preventing dental caries. When said pick and stream of water is combined with the massaging vanes or blades of hydro massaging apertures, said implement can also be used to clean the teeth along the gum line. Thus as the pick is anchored between the teeth, the radial blades or vanes or radial ridges are rotated first clockwise and then counter-clockwise. Since the distance between the tip of pick and the top of massaging cap is adjustable or is already fixed at a proper distance, the water delivery pick combined with a massaging cap becomes a highly useful team.

Some of the materials that can be absorbed into its spongy matrices are NaCl, buffered pH 7 soap, detergents, essential oils, bonemeal urea thymol, etc., etc.

In order to properly meter the rate of solution of the dentifrices, vegetable gums and compounds such as methyl cellulose can be absorbed as well. For example: high molecular weight methyl cellulose is only slowly soluble. Note that the radial and circular ridges depicted in FIGS. 19, 20, 28 and 29 are interspersed with apertures and that each vane or blade is the outer limits of an aperture. Therefore, the vanes or blades 2902 and 2905 (FIG. 29), 2312, 2310 (FIG. 23), 1910, 1902 (FIGS. 20 and 19) and etc. are really the rims of massaging therapeutic apertures, since they are the outer limits of said apertures.

Massaging hydro-therapeutic apertures may eventually assume a large variety of shapes and forms.

FIG. 23 depicts another way of regulating the size of aperture around pick, and through which the pick projects.

FIG. 23 shows the base of pick 2326 having threads and being threaded into mounting bar 2375 via corresponding threads 2325; in mounting bar 2375 by turning knob 2327 the cross-sectional area of aperture 2303 can be varied and the distance of tip of pick 2309 to top of sleeve 2302 can also be varied. If the pick is tightly threaded into base, a lock nut will not be needed.

FIG. 16 shows a pick 1628 with an automatically controlled aperture 1620; the sleeve 1611 is thin-walled and made of highly elastic material. The greater the water pressure, the larger the aperture becomes.

FIG. 14 shows water —W leaving both, through central aperture 1409 and through apertures 1407. Thus the massaging bulbs radii 1402 are surrounded by a stream of water.

FIG. 30 shows a top perspective view of FIG. 14.

FIGS. 20, 28 and 29 also show massaging vanes that are surrounded by streams of water during operation. However, the simplest aperture is a simple jacket hole 32, FIG. 12.

FIG. 17 describes a casing (K) into which a toothbrush and handle or toothpick and handle can be placed through aperture 1776. To place a toothbrush into casing one bends back tubing at or near line 17A and pushes handle and brush down cavity 1780 till only the bristles of brush protrude above the jacket 1777. The jacket consists of plastic or rubber or elastic tubing or other semi-rigid material and having end hole sealed at the brush end by wall 1782 so that the only opening at implement end is the aperture 1776. The other end of tubing has faucet adaptor C or C1, fitted into water duct 1780, casing K with its faucet adaptor can be sold to convert the average toothbrush to a water delivery toothbrush or the average toothpick and its handle to a water delivery toothpick.

FIG. 21 sleeve U can be used to convert casing K to a water delivery toothpick casing. Said sleeve U is placed over foot F of casing K by placing foot F through aperture 2104 of sleeve U, so that aperture 2105 rests over aperture 1776, FIG. 17. Pick and handle are placed within duct 1780, so that pick projects above casing 1777 and out aperture 1776, prior to placing sleeve U in position. Once sleeve U is in position, the pick will project through and above aperture 2105; aperture defining sleeve 2109 has slots 2107 lying between ridges 2106 in the rim of aperture 2105; said slots 2107 are used to hold disposable pads described in FIG. 29. Pad R consists of radial and circular vanes and the apertures that lie between the vanes.

Previous water delivery toothbrushes delivered water through apertures within the mounting bar that held the bristles and said apertures are placed between tufts of bristles. Such a design has several disadvantages; said apertures between the tufts of bristles would of necessity be small apertures. Also said apertures would have to be out of line with the tufts of bristles. In addition said small apertures would be unable to deliver an adequate volume of water. Large apertures between bristles would weaken the foundation that holds the bristles in place.

FIG. 32 describes one plan that may avoid some of the disadvantages of supplying water directly through the mounting bar.

FIG. 32A is a section across the top of mounting bar 3201. Water enters through duct 3205 within handle 3276 and passes down water duct 3230 (FIG. 32C). Said water duct 3230 runs below mounting bar 3201; said duct 3230 lies between the base of brush 3208 and mounting bar 3201, and side-wall 3251. As the water travels down 3201, it gushes out central slot 3206 and side slots 3256. The tufts of bristles 3220 are mounted in mounting bars 3201 and are surrounded on three sides by streams of water. If the maximum number of and size of apertures were placed between the tufts of bristles, the result would be the slots 3206 and 3256. Such slots are made possible by making the brush mounting bar 3201 slightly longer and wider than the average toothbrush mounting bar and by angling the tufts of bristles slightly to the sides. The bristles extend over said slotted apertures 3256-3206, thus the tops 3260 of the tufts 3261 are of greater diameter than the diameter of the base of the bristles 3261. The increased diameter of the top of the tufts of bristles is enough to cover the slots 3256 and 3206, and places the bristles directly within streams of water. Thus, the slots make possible the maximum flow of water through the mounting bar; in addition they place bristles within a stream of water. However, unless there is a separate water jacket 3230 below the mounting bar, the flow of water to the slots would be severely limited, by the size of the duct that delivers water. Water jacket rim 3250 directs the water into a central stream that flows down the bristles. The fact that the tufts of bristles are surrounded by jacket 3250 and are surrounded on three sides by a stream of water of adequate volume, makes possible water delivery through the mounting bar. However for best results slotted apertures water source system can be combined with the jacket system described in FIG. 18.

FIG. 18 describes another plan which makes it possible to deliver water to the toothbrush through a channel 179 within handle 178. However, water is delivered to a jacket 1800, that surrounds the mounting bar 175, upon which the bristles 20 are mounted. The bristles 20 project through a slotted aperture 176 in jacket 1800. The jacket 1800 is actually a ballooned out section of duct 179 and is sealed on all sides, except for the slotted aperture 176 and the water inlet port 2078. The primary advantages to a jacket is the fact that water is directed around the mounting bar, rather than through it, the resulting ducts 179 and 180 can be made as large as needed; thus there are not any reasonable limitations placed on the volume of water that can be delivered to and from aperture 176; also the curvature of the jacket 1800 directs the stream of water towards and down the bristles 20. Unfortunately, a single large aperture 176 will greatly decrease the hydraulic pressure behind the stream of water being delivered to the teeth and gums.

FIG. 1 shows apertures 21 in jacket 11. These apertures 21 surround the tufts of bristles 20. Apertures 21 can be made as large as desirable without weakening the foundation that holds the bristles in mounting bar 10. Thus, an adequate stream of water can be supplied to each tuft of bristles individually and directly upon them, but since apertures 21 are somewhat limited in size, the streams of water that leave these apertures are under considerable more pressure than the stream of water that leaves elongated slotted aperture 176, FIG. 18.

FIG. 27 is a medicinal or detergent capsule. It consists of a hollow shell 2711 and inlet apertures 2700 and 2701. Aperture 2701 connects with hollow tube 2702 and hollow bulb 2706 followed by hollowed tube 2707. Tube 2707 is connected with elastic tubing 35. Hollowed bulb 2706 and 2716 contain glass wool, in order to keep solid particles from escaping from within the capsule. Aperture 2700 connects with tube 2705 and thence with hollow bulb 2716 and finally with tube 2707. The hollow interior 2710 of capsule X contains large particles of medicinal compounds 2704 that are embedded in layers of glass wool 2709. The glass wool facilitates the passage of the water through the capsule and the large particle size slows the rate of solution into the water. Other inert fibrous material can replace the glass wool.

FIG. 24 shows how the detergent capsule can be hooked into the water system. Hot and cold sources of water enter faucet adaptors 2400 and 2401. The hot and cold water is combined by Y tube 2402. Combined hot and cold water enters second Y tube 2403, which branches into two major water lines, M and N.

Water line M goes through detergent capsule and water line N delivers pure water N; water can be directed through lines M or N by one of two methods:

(1) Screw clamps Z FIG. 25 can be adjusted to close off water flow down one of the water lines M or N.

(2) Valve E1 can be used. By using E1, it is possible for the user to flip from a source of pure water to a source of dentifricially useful water and vice versa. Exit tube 55 connects with dental implements herein described. Tubing 2135 can be cut to remove and replace capsule X, screw clamp Z (FIG. 25) has flange 113 and is of such dimensions that it exactly fits tube 35. Flange 113 prevents the clamp from falling off tube 35.

FIG. 22 faucet adaptor C1 is especially suited for this invention, because it offers the least resistance to water in flow, as the water enters the adaptor. This is true because C1 is unusually thin-walled; the thinness of this wall is made possible by the fact that it is composed mostly of a strongly built shell 137, that has a tapered end. Said tapered end fits into the faucet. The tapered end is covered with an elastic material. The elastic material forms a flexible, durable casing 136 on the tapered end of shell 137; thus, when faucet adaptor C1 is wedged into a faucet, it compresses the elastic layer. These compressive forces are met and equally opposed and maintained by the strongly built, but thin inner shell 137. The combination of strong wedging forces and small resistance to the inflow of water helps keep the faucet adaptor C1 within the faucet. The other end of the faucet adaptor has a hose adaptor H, which connects with hose 35.

FIG. 26 shows four possible variations of this invention.

FIG. 26A shows a brush B and its handle 2675 within flexible tubing 2677 with bristles 20 protruding through aperture 2676. The other end of flexible tubing has a faucet adaptor C1. The brush end of the flexible tubing is sealed, except for aperture 2676. Tubing 2677 is of sufficient length to permit the use of the brush, while the faucet adaptor is within a faucet. When in use, water enters through the faucet adaptor C1 and travels down the duct within tubing 2677 and over the brush handle 2675 and finally out aperture 2676.

FIG. 26B is the same as 26A, except that a pick and its handle is placed within tubing 2677 via aperture 2676. FIG. 26B also has aperture defining collar U fitted over pick 2105 on tubing 2677. Since adaptor U has slotted rim on top of sleeve 2109 into which disposable pads of FIG. 29 can be placed, the pick depicted in FIG. 26B can be used for massaging the tartar off the teeth as well as cleansing the area between the teeth once the disposable pad is placed on top of sleeve Z109.

FIG. 26C shows a dental implement with handle 2675 that has a brush mounted on one end said bar 2675 and pick mounted at the other end of said bar 2675 and a water jacket 2677 going to the brush, completely sealed around said mounting bar 2675, but no water jacket going to pick end of bar 2675. Brush bristles project through aperture 2676 in jacket 2677. Said water jacket has a duct 2694 within it and said duct is defined as space between the inner wall of jacket 2677 and the outer surface of mounting bar 2675. Water enters said jacket duct 2694 through aperture 2642 on sleeve 240 and traversing duct 2690 within said sleeve 240. After traversing duct 2694, water exits through aperture 2676 and travels down bristles 20.

FIG. 26D is the same as 26C, except that water jacket 2677 leads to the pick 2628 and aperture through which the pick 2630 projects. Said pick is anchored in mounting bar 2675. Water enters aperture 2641 and travels down duct 2690 and enters duct 2693 within jacket 2677 and continues down jacket duct 2693 until said water flows out of jacket aperture 2630 and down and around spike 2628.

FIG. 17A is a cross-section through casing K along the line 17A, 17A note the highly flexible thin inner lip 1776A which is cemented into place on the inner rim of aperture 1776; said inner lining 1776A because it is flexible—has three functions.

(1) It makes it easier to place said brush into cavity 1780.

(2) It assures a tighter fit once the brush is in place and thus, helps to keep the brush within casing. Pressurized water would tend to push the brush out of casing K, unless lining 1776A was holding the brush in place.

(3) It helps direct the water down the bristles. Reinforced base 1220 also helps to keep the lining within tube. Without reinforcement 1220 and lining 1776A the casing K would tend to pull away from the toothbrush.

One primary characteristic of the hydro-massaging surface is the fact that such a surface has full contact with the surface being massaged or cleaned, as it is swept across the surface of the teeth and gums. On the other hand, bristles are only in contact with part of the surface, and only that area covered by the tip of the bristle, will be effected as the bristle is swept across the surface.

Another characteristic of the hydro-massaging surface is the fact that water flows around each of the rims or massaging vanes or blades, as they are swept across the surface.

A third characteristic of the hydro-massaging surface is the fact that it is made out of soft pliable, probably sponge-like material and thus, the massaging vanes can assume the contour of the surface it is passed over.

Fourthly, the hydro-massaging surface has a web-like structure. A web-like structure facilitates the ability of the hydro-massaging surface to assume the contour of the surface over which it passes. In addition the apertures between the web of surfaces are fully used for delivering water, and said apertures between the web-like structure of the hydro-massaging surface can be maximized.

FIGS. 11A and 11B describe one means of mechanically applying pressure to finger pressure bar 83, and may be more properly named a strap hose clamp.

Said clamp consists of the finger pressure bar 83 held in place by strap 81. Strap 81 is fastened to jacket 77 and completely encircles jacket 77. Straps 801 lie on both sides of strap 81 and also completely encircles jacket 77 and are fastened to a second pressure bar 800.

Said second pressure bar 800 has a centrally located threaded shaft through it and through which bolt 803 is threaded. Knob 804 enables the user to thread the bolt 803 up or down. If bolt 803 is threaded down far enough jacket 77 will be compressed against mounting bar 75, thereby closing off duct 79 or 80 and vice versa.

I claim:

1. An hydraulic dental implement for cleansing and therapeutic action, comprising: a mounting bar; a jacket extending lengthwise of said bar and attached thereto so as to constitute cooperatively with said bar a manipulative handle, said jacket being spaced from said bar to define a water duct; an elongated tooth-cleansing element anchored in said mounting bar, traversing said water duct and projecting through a wall of said jacket opposed to said bar, and means on said opposed jacket wall defining an aperture of larger diameter than a portion of said cleansing element which projects through said aperture in spaced relation thereto, defining an annular water jet port around said element portion, through which a tubular jet of water ejected from said duct will follow said cleansing element and impinge upon a dental area being cleansed by scrubbing action of said cleansing element; and means to supply a pressurized flow of water into said duct, so as to develop said jet.

2. A dental implement as defined in claim 1, wherein said cleansing element is a conical pick having a base portion anchored in said bar and a tapering spike portion projecting externally of said jacket, for use in a picking-cleaning operation.

3. A dental implement as defined in claim 2, said aperture-defining means comprising a threaded cap having an end wall provided with said aperture through which said tapering spike portion projects, and a threaded tubular collar on said opposed jacket wall, onto which said cap is threaded for adjustment axially of said spike portion, such as to vary the area of said annular port defined within said aperture.

4. A dental implement as defined in claim 3, wherein said pick is of a soft, resilient material so as to function for gum massage as well as picking.

5. A dental implement as defined in claim 1, wherein said cleansing element is one of a plurality of brush bristle tufts each having a stem portion projecting through a respective aperture in said opposed jacket wall and defining therewith an annular port as described in claim 1.

6. A dental implement as defined in claim 1, including a plurality of said cleansing elements in the form of brush bristle tufts at one end of said handle and another element in the form of a pick at the other end of said handle; means separating the space between said water jacket and bar into two of said ducts, one leading to said brush tufts and the other to said pick; and means connecting said water supply means to said handle and providing for selectively directing said water flow to said bristle tufts or to said pick.

7. A dental implement as defined in claim 1, including a plurality of said cleansing elements in the form of brush bristle tufts at one end of said handle and another element in the form of a pick at the other end of said handle; means separating the space between said water jacket and bar into two of said ducts, one leading to said brush tufts and the other to said pick; and means connecting said water supply means to said handle and providing for selectively directing said water flow to said bristle tufts or to said pick, said connecting means comprising a pair of threaded inlet nipples on said bar each connected to a respective duct, and a threaded gland nut for selectively coupling said water supply means to either of said nipples.

8. A dental implement as defined in claim 1, including a plurality of said cleansing elements in the form of brush bristle tufts at one end of said handle and another element in the form of a pick at the other end of said handle; means separating the space between said water jacket and bar into two of said ducts, one leading to said brush tufts and the other to said pick; and means connecting said water supply means to said handle and providing for selectively directly said water flow to said bristle tufts or to said pick, said connecting means comprising a rotary selector valve embodied in said bar, having an inlet connection to said water supply means and operable for selective connection to either of said ducts.

9. A dental implement as defined in claim 1, including a plurality of said cleansing elements in the form of brush bristle tufts at one end of said handle and another element in the form of a pick at the other end of said handle; means separating the space between said water jacket and bar into two of said ducts, one leading to said brush tufts and the other to said pick; and means connecting said water supply means to said handle and providing for selectively directing said water flow to said bristle tufts or to said pick, said connector means comprising a slide valve in the space between said bar and the opposed jacket wall and constituting said duct-separating means, and an inlet port in said bar, said valve being slidable to a position on either side of said port so as to selectively connect the same to either of said ducts.

10. A dental implement as defined in claim 1, including a plurality of said cleansing elements in the form of brush bristle tufts at one end of said handle and another element in the form of a pick at the other end of said handle; the space between said water jacket and said bar defining two of said ducts, one leading to said brush tufts and the other to said pick; and wherein said jacket is of flexible material adapted to be collapsed against said bar in order to selectively close off either of said ducts and thereby direct the flow of water through the other duct; and a single water supply inlet normally communicating with both of said ducts as a point intermediate said ducts.

11. An implement as defined in claim 10, including a finger pressure bar disposed astride said jacket above the respective ducts on respective sides of said inlet, and a pair of flexible straps joined to the ends of each of said pressure bars and attached to respective sides of said jacket to position the respective pressure bar in astride relation to the jacket.

12. A dental implement as defined in claim 1, including a plurality of said cleansing elements in the form of brush bristle tufts at one end of said handle and another element in the form of a pick at the other end of said handle; means separating the space between said water jacket and bar into two of said ducts, one leading to said brush tufts and the other to said pick; and including a barrier in said jacket, separating adjacent ends of said ducts; a pair of inlets communicating with respective ducts on respective sides of said barrier; a pair of flexible, collapsible tube sections having their one ends connected to respective inlets; a Y-branching fitting connecting the other ends of said tube sections to a common source of water supply; and respective clamps operative on the respective tube sections to selectively collapse one or the other so as to shut off flow to a respective duct and thereby direct the flow to the other duct.

13. A dental implement as defined in claim 1 wherein said water jacket takes the form of a sealed hollow and elongated tube; said jacket completely encircles said mounting bar and the dental implement mounted upon said mounting bar; said dental implement protrudes through an aperture in said jacket; said aperture being larger than said dental implement permits pressurized water to flow down the outside surface of said dental implement and thereby assists said implement in its cleansing and hydrotherapeutic functions; water reaches said aperture via channels that are formed by the spaces that lie above or below or to the sides of said mounting bar; said channels are defined as the spaces between the inside surface of said jacket and the outside surface of said mounting bar that connect with the useful apertures.

14. A dental implement as defined in claim 13, wherein said hollow elongated tubular packet has the means by which the average toothbrush and its handle and the average toothpick and its handle can be placed within or removed from said hollow elongated tubular jacket, said jacket has a slotted elongated aperture through which said brush and pick protrudes above and beyond the outer surface of said jacket.

15. A dental implement as defined in claim 1 including a plurality of said cleansing elements in the form of brush bristle tufts at one end of said handle, and another element in the form of a pick at the outer end of said handle; the space between said water jacket and said bar defining two of said ducts one leading to said brush tufts and the other to said pick, and wherein said jacket is of flexible material adapted to be collapsed against said bar, in order to selectively close off either of said ducts and thereby direct the flow of water through the other duct; a single water supply inlet normally communicating with both said ducts at a point intermediary to said ducts; a flexible band is used to close off the desired duct by stretching said band around the duct and fastening both ends of said band onto peg, by placing said peg within annular aperture on both ends of said band.

16. A dental instrument as defined under claim 1, wherein said cleansing element is a conical pick having a base portion anchored in said bar and a tapered spike portion projecting through and above a sleeve, said sleeve encircles an aperture in said jacket, and said sleeve permanently mounted upon said jacket, said sleeve has a centrally located aperture in its outer end wall, said spike projects through and above said centrally located end wall aperture, said sleeve end wall has additional apertures through which water can flow.

17. A dental implement is defined under claim 16, wherein said pattern of rims of apertures form vanes and said vanes are separated by apertures through which pressurized water flows; said pattern of vanes forms a series of circular and radial vanes.

18. A dental implement as defined in claim 17, wherein said pattern of massaging orifices is formed by orifices within a disposable pad, said pad has means that will permit said disposable pad to be fastened over said end opening of said sleeve, said sleeve is so situated on said jacket that said orifice in said jacket is entirely contained within said sleeve and so said pick projects through said orifice in said jacket and through and above central orifice in said disposable pad; water passes from within said water jacket, through said orifice in said water jacket, through said sleeve and through all the orifices within said end wall of said disposable pad, and around said vanes of massaging rims; said massaging rims of orifices form a useful pattern of massaging vanes.

19. A dental implement as defined in claim 18, wherein said useful pattern of massaging rims of orifice forms a series of circular and radial vanes; said means of attaching said disposable and replaceable pads are the ends of the radial vanes; said ends of radial vanes are wedged within corresponding slots on the rims of the end hole of said sleeve.

20. A dental implement as defined in claim 19, wherein said disposable pad is composed of sponge-like material and contains dentifrice, which is activated by the water that flows around the ridges that define said hydrotherapeutic massaging orifices.

21. A dental implement as described in claim 3, wherein said threaded cap has a top surface made from sponge-like material with radial ridges, and where said cap can be disposable and replaceable and has therapeutic dentifrice, saturated into the sponge-like top of the cap.

22. A dental implement as defined in claim 3, wherein said cap is composed of a tapered sleeve and an end wall that has hydro-massaging, cleansing orifices and a central aperture through which said spike of pick can protrude, said cap sleeve fits over said jacket sleeve, said jacket sleeve has a taper that corresponds with cap-sleeves taper, said jacket sleeve concentrically integrally surrounds said aperture in jacket F through which pick spike protrudes; said sleeve on cap is wedged over and onto jacket sleeve and forms a water tight fitting; said cap sleeve has circular and radial ridges that fit into corresponding slotted grooves on jacket sleeve; said circular ridges within cap sleeve tend to anchor to sleeve in position and said vertical ridges tend to prevent rotational movements.

23. A dental implement as defined in claim 1, wherein said implement is a tapered pick, and said pick is anchored to said mounting bar by a threaded base portion on pick and a corresponding threaded shaft in mounting bar; said spike of pick protrudes through said aperture in said jacket and tip of spike projects above outer surface of jacket, said spike being tapered can regulate size of orifice, by being threaded closer or farther from inside surface of jacket, said change in orifice will also regulate the distance of the tip of pick from the outside surface of jacket.

24. A dental implement as defined in claim 1, wherein said means of supplying water to said inlet apertures of said implements includes two water lines; one of the lines delivers pure water, the other line is hooked into a therapeutic pack and therefore delivers water that has a therapeutic and cleansing compound dissolved within it; said therapeutic cleansing pack consists of an outer inert water tight shell into which is packed large particles of therapeutic compounds intermeshed with layers of inert fibrous material; said therapeutic pack has an inlet nipple and an outlet nipple which permit water to enter and leave the pack; said nipples have enlarged chambers that also contain inert fibrous material; said enlarged nipple chambers and fibrous material prevent the loss of solid particles from central cavity of pack; said two water lines are connected to valve that can be used to select either the pure water line or the therapeutic pack line as the source of water entering the dental implement, said water lines also have screw clamps attached to the flexible tubing of said lines; said screw clamps can also be used to control the flow of water.

25. A dental implement as defined in claim 1, wherein said means of supplying pressurized water includes a faucet adaptor; said faucet adaptor is composed of a thin walled jacket that has a tapered portion on one end and a hose adaptor on its other end; said hose is attached to the hose adaptor and resilient material is cemented to the tapered portion of said adaptor; said adaptor can be wedged into the open end of faucet with little danger of being forced out of faucet by the water pressure, because its thin walls offer little resistance to the water and because the jacket is strong enough to permit the adaptor to be solidly wedged into the faucet aperture and because the elastic covering on the tapered stems increases the frictional and wedging forces that hold the adaptor within the outlet aperture of said faucet.

26. A dental implement as defined under claim 1, wherein said implement is a pick that is mounted to said mounting bar and said pick projects through an aperture in said jacket and through a coaxial sleeve that is mounted to the outside surface of said jacket; said sleeve has an automatically controlled orifice in that said sleeve is made of flexible material and is thin walled near the orifice; the greater the water pressure, the larger the size of the orifice.

27. A dental implement as defined in claim 1, including a plurality of said cleansing elements in the form of brush bristle tufts at one end of said handle and another element, in the form of a pick at the other end of said handle, means of providing a water duct to pick, and means of connecting said duct to a source of water and means of directing said water, so it flows down and around the outside surface of said pick.

28. A dental implement as defined in claim 1, wherein said jacket is an elongated hollow flexible tube containing a water duct throughout its length; said tube has a faucet adaptor at one end of tube and said dental implement protrudes through an aperture near the other end of said elongated tube; said elongated tube has an outer wall that becomes said jacket; said dental implement and said mounting bar upon which said implement is mounted are contained within said duct, said dental implement projects through a coaxial aperture in said jacket and no other apertures exist on the implement end of said elongated tube.

29. A dental implement as defined in claim 1, wherein said implement projects through an aperture in said mounting bar and said implement is mounted to said mounting bar; said mounting bar is also contained within said jacket and where said jacket has a threaded nipple, said nipple has a duct throughout its length, said duct connects with the inside duct of said jacket and when said nipple is connected with a source of water, water flows through the nipple and through said water duct within said jacket and around the outside of said mounting bar and implement and out the aperture through which the implement projects; a threadable connection carries said implement for threadably coupling to a T adaptor, said T adaptor has three arms; two said arms have threaded ends upon which said implements with threaded jackets can be threaded; the third arm of the T adaptor has means of connection with source of water; all three arms of said T adaptor have ducts that run throughout their lengths, and all three ducts intersect and thus when two implements are threaded into said T adaptor, water enters through the third arm and can go towards either implement and means of stopping the flow of water towards one implement will direct the water towards the other implement.

30. A dental implement as defined in claim 1, in the form of a toothbrush with a water channel that passes through the handle of the said toothbrush; said water channel within handle connects with a water duct that lies beneath the mounting bar that holds the bristles; water penetrates said mounting bar through slots that run between the longitudinal and transverse rows of tufts of bristles, said system of slotted apertures makes possible the maximum flow of water through said mounting bar.

31. A dental implement as defined in claim 1, including a plurality of said cleansing elements in the form of brush bristle tufts at one end of said handle and another element, in the form of a pick at the other end of said handle, means of providing a water duct to brush and means of connecting said duct to a source of water and means of directing said water, so it flows down and around the outside surface of said brush.

References Cited

UNITED STATES PATENTS

| | | | |
|---|---|---|---|
| 1,173,265 | 2/1916 | Hallstrom | 401—291 XR |
| 1,230,325 | 6/1917 | Pride | 401—291 XR |
| 2,148,483 | 2/1939 | Love et al. | 128—62 |
| 2,813,529 | 11/1957 | Ikse | 128—229 |

FOREIGN PATENTS 559,166  9/1932  Germany.

L. W. TRAPP, Primary Examiner

U.S. Cl. X.R.

128—229